(12) United States Patent
Iihoshi et al.

(10) Patent No.: US 11,364,909 B2
(45) Date of Patent: Jun. 21, 2022

(54) VEHICLE CONTROL DEVICE

(71) Applicant: Hitachi Automotive Systems, Ltd., Hitachinaka (JP)

(72) Inventors: Yoichi Iihoshi, Tokyo (JP); Takashi Okada, Ibaraki (JP); Kengo Kumano, Ibaraki (JP); Yuuki Okuda, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/046,844

(22) PCT Filed: Apr. 10, 2019

(86) PCT No.: PCT/JP2019/015551
§ 371 (c)(1),
(2) Date: Oct. 12, 2020

(87) PCT Pub. No.: WO2019/235056
PCT Pub. Date: Dec. 12, 2019

(65) Prior Publication Data
US 2021/0046933 A1   Feb. 18, 2021

(30) Foreign Application Priority Data
Jun. 6, 2018  (JP) .............................. JP2018-108234

(51) Int. Cl.
*B60W 30/16* (2020.01)
(52) U.S. Cl.
CPC ....... *B60W 30/162* (2013.01); *B60W 2556/10* (2020.02)

(58) Field of Classification Search
CPC .......... B60W 30/162; B60W 2556/10; B60W 30/18154; B60W 50/14; B60W 2520/04;
(Continued)

(56) References Cited

U.S. PATENT DOCUMENTS 6,314,347 B1   11/2001 Kuroda
2011/0106419 A1   5/2011 Kim
(Continued)

FOREIGN PATENT DOCUMENTS

JP   2000-333305 A   11/2000
JP   2000333305 A * 11/2000 ............. B60K 6/543
(Continued)

OTHER PUBLICATIONS

English Translation_JP2017/149177A (Year: 2017).*
(Continued)

*Primary Examiner* — Peter D Nolan
*Assistant Examiner* — Ashley L Redhead, Jr.
(74) *Attorney, Agent, or Firm* — Foley & Lardner LLP

(57) ABSTRACT

The movement of the vehicle is controlled so that the travel time does not become long while reducing the fuel consumption of the vehicle. A vehicle control device 1 that automatically controls a speed of a vehicle is configured to include an acceleration/deceleration pattern setting unit 22 that sets a plurality of acceleration/deceleration patterns including acceleration and deceleration in a traveling scheduled zone and sets the speed to be the same in a region between an acceleration region and a deceleration region in each acceleration/deceleration pattern based on traveling history in a traveling scheduled zone.

15 Claims, 9 Drawing Sheets

(58) Field of Classification Search
CPC ....... B60W 2520/10; B60W 2554/802; B60W 2556/50; B60W 2720/10; B60W 2720/106; Y02T 10/84; G08G 1/16
See application file for complete search history.

(56) References Cited

U.S. PATENT DOCUMENTS

| | | |
|---|---|---|
| 2012/0221170 A1 | 8/2012 | Tanoue |
| 2015/0185028 A1 | 7/2015 | Kinoshita |
| 2017/0116854 A1 | 4/2017 | Sugawara |

FOREIGN PATENT DOCUMENTS

| | | | | |
|---|---|---|---|---|
| JP | 2009-165304 A | | 7/2009 | |
| JP | 2011-095251 A | | 5/2011 | |
| JP | 2012-208829 A | | 10/2012 | |
| JP | 2014-115877 A | | 6/2014 | |
| JP | 2014115877 A | * | 6/2014 | ........... G08G 1/0112 |
| JP | 2014-126981 A | | 7/2014 | |
| JP | 5985115 B2 | | 9/2016 | |
| JP | 2017-149177 A | | 8/2017 | |
| JP | 2017149177 A | * | 8/2017 | |
| WO | WO-2011/024878 A1 | | 3/2011 | |
| WO | WO-2014/002209 A1 | | 1/2014 | |

OTHER PUBLICATIONS

English Translation_JP2000/333305A (Year: 2000).*
English Translation_JP2014115877A (Year: 2014).*
International Search Report with English translation and Written Opinion issued in corresponding application No. PCT/JP201/015551 dated Jul. 2, 2019.

* cited by examiner

VEHICLE CONTROL DEVICE

TECHNICAL FIELD

The present invention relates to a vehicle control device.

BACKGROUND ART

In recent years, for the purpose of avoiding traffic accidents and convenience, the development of driving assistance technology that supports the driver's accelerator operation and braking operation according to the distance from the preceding vehicle, or automatic driving technology that automatically drives the vehicle is advancing. In these technologies, a vehicle control device recognizes a surrounding environment based on sensing information obtained from a camera, a radar, or the like mounted on a vehicle, and controls a power train such as an engine or a motor, a brake, or the like. In this type of vehicle control device, in order to reduce the fuel consumption of the vehicle, a technique of generating and correcting a traveling pattern from the past traveling history of the vehicle (PTL 1) and a technique of predicting a vehicle stop position to calculate a traveling plan (PTL 2) are disclosed.

CITATION LIST

Patent Literature

PTL 1: JP 5985115 A
PTL 2: JP 2012-208829 A

SUMMARY OF INVENTION

Technical Problem

However, these conventional techniques do not consider at all the coexistence of fuel efficiency and travel time (driving time from the starting point to the destination). Specifically, with regards to the fuel consumption of the vehicle, since the traveling resistance of the vehicle increases with the square of the speed, the fuel efficiency is higher the lower the speed during cruise driving (hereinafter also referred to as the cruising speed). On the other hand, if the cruising speed is lowered to improve fuel efficiency, the travel time becomes longer. For example, in an Adaptive Cruise Control (ACC) device, if the driver sets the set speed of the own vehicle too high, the own vehicle follows the movement of the preceding vehicle, where if the acceleration/deceleration of the preceding vehicle is frequent, the acceleration/deceleration of the vehicle becomes frequent and fuel consumption deteriorates. On the other hand, if the set speed of the own vehicle is set low, the own vehicle can reduce the fuel consumption without following the movement of the preceding vehicle. However, in this case, the travel time of the own vehicle becomes long, and there is a risk of causing congestion if there is a vehicle behind.

Therefore, it is an object of the present invention to control the movement of a vehicle so that the travel time does not become long while reducing the fuel consumption of the vehicle.

Solution to Problem

In order to solve the problems described above, a vehicle control device that automatically controls a speed of a vehicle is configured to include an acceleration/deceleration pattern setting unit that sets a plurality of acceleration/deceleration patterns including acceleration and deceleration in a traveling scheduled zone and sets the speed to be the same in a region between an acceleration region and a deceleration region in each acceleration/deceleration pattern based on traveling history in a traveling scheduled zone.

Advantageous Effects of Invention

According to the present invention, the movement of the vehicle can be controlled so that the travel time does not become long while reducing the fuel consumption of the vehicle.

DESCRIPTION OF EMBODIMENTS

Internal Combustion Engine

Hereinafter, embodiments of the present invention will be described in detail with reference to the drawings.

Figure 1:
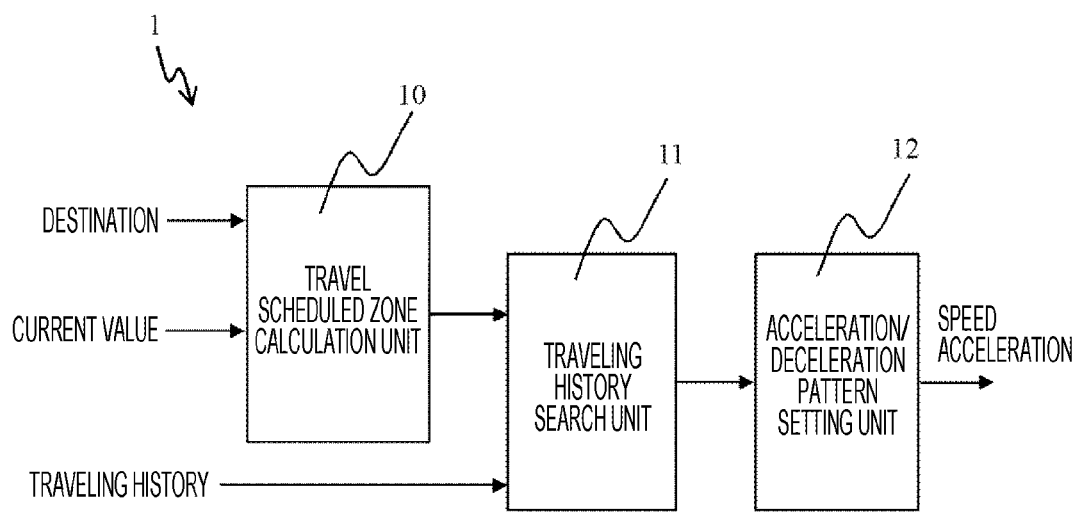
FIG. 1 is a block diagram describing a function of a vehicle control device.

FIG. 1 is a block diagram describing the function of a vehicle control device 1.

As shown in FIG. 1, the vehicle control device 1 is configured to include a traveling scheduled zone calculation unit 10, a traveling history search unit 11, and an acceleration/deceleration pattern setting unit 12. These traveling scheduled zone calculation unit 10, the traveling history search unit 11, and the acceleration/deceleration pattern setting unit 12 are functions implemented by a Central Processing Unit (CPU, not shown) of the vehicle control device 1 executing a control program stored in the main memory (not shown) or the like. The traveling scheduled zone calculation unit 10 calculates the traveling scheduled zone of the vehicle from the current location and the destination of the vehicle and acquires the departure time.

The current location of the vehicle is acquired by communication from a Global Positioning System (GPS) mounted on the vehicle or a wireless base station. The destination of the vehicle can be acquired from the destination information at the time of route search input to the car navigation, smartphone, or the like. The traveling scheduled zone calculation unit 10 can specify the traveling scheduled zone from the acquired current location and destination with reference to the map data. The traveling history search unit 11 searches the past traveling history of the vehicle in the traveling scheduled zone specified by the traveling scheduled zone calculation unit 10, and extracts the time the vehicle traveled below a set lower limit speed in the traveling scheduled zone (also referred to as "stop time") and the number of times the vehicle traveled below the set lower limit speed (also referred to as "number of stops") from the traveling history. Here, the set lower limit speed is a speed at which the vehicle becomes lower than or equal to a lower limit speed set in advance. For example, the set lower limit speed is a speed lower than or equal to the creep speed of the vehicle, and also includes a state in which the vehicle is stopped. The traveling history of the vehicle is history information about the traveling of the vehicle in the past, and a plurality of past traveling histories are stored in a storage device (not shown) in association with the current location and the destination. This storage device (not shown) may be provided in the vehicle control device 1, or may be provided in an external server provided outside the vehicle or on a cloud. In this case, the vehicle control device 1 and the external server or the cloud server can communicate with each other via an electric communication line such as the Internet. The acceleration/deceleration pattern setting unit 12 notifies the driver of the traveling history of the vehicle including the stop time and the number of stops extracted by the traveling history search unit 11, or outputs the traveling history to another Electronic Control Unit (ECU, not shown). With the configuration described above, the acceleration/deceleration pattern setting unit 12 can generate and set a low fuel consumption acceleration/deceleration pattern 100 (see FIGS. 6 and 7) that takes into consideration the acceleration/deceleration information of the vehicle that occurred many times in the past near the traffic light and the intersection based on the past traveling history. The traveling history described above is not limited only to the traveling history of the own vehicle, and the traveling history of another vehicle acquired through communication or the like may be used. Thus, a more appropriate acceleration/deceleration pattern 100 can be generated and set from the traveling history of many vehicles.

Next, the conventional ACC device 2 will be described.

Figure 2:
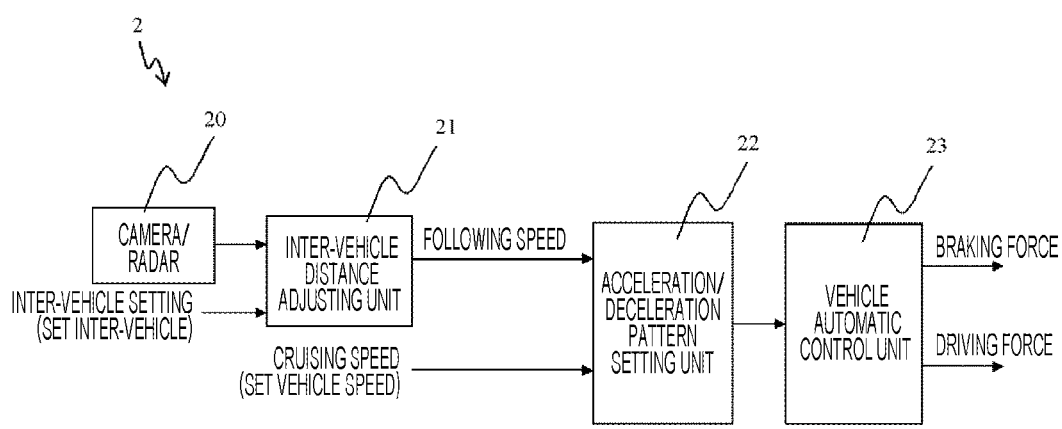
FIG. 2 is a block diagram describing a function of a conventional ACC device.

FIG. 2 is a block diagram describing the function of the conventional ACC device 2.

As shown in FIG. 2, the ACC device 2 is formed by including an inter-vehicle distance detecting device such as a camera/radar 20, an inter-vehicle distance adjusting unit 21, an acceleration/deceleration pattern setting unit 22, and a vehicle automatic control unit 23. The inter-vehicle distance adjusting unit 21 calculates the speed of the own vehicle (hereinafter also referred to as following speed) for following the preceding vehicle so that the actual inter-vehicle distance between the own vehicle and the preceding vehicle detected by the camera/radar 20 becomes the inter-vehicle distance set by the driver (set inter-vehicle distance). The acceleration/deceleration pattern setting unit 22 calculates the target speed based on the set value of the set speed (cruising speed) when the preceding vehicle is not detected and the following speed calculated by the inter-vehicle distance adjusting unit 21. The vehicle automatic control unit 23 calculates the driving force to the traction device and the braking force to the braking device based on the target speed calculated by the acceleration/deceleration pattern setting unit 22. When a high set speed is set by the ACC device 2 described above, the time for following the preceding vehicle becomes long, and the own vehicle also follows and the fuel consumption deteriorates when the driving of the preceding vehicle is rough (when acceleration/deceleration is frequently performed). Alternatively, when a low set speed is set, the number of scenes falling behind the preceding vehicle increases and although the fuel efficiency improves, the travel time becomes longer. Here, the travel time is a driving time required for the own vehicle to travel from the current location to the destination.

Next, the simulation results of the fuel consumption of the vehicle and the relative distance to the preceding vehicle based on the acceleration/deceleration pattern set by the conventional ACC device will be described.

Figure 3:
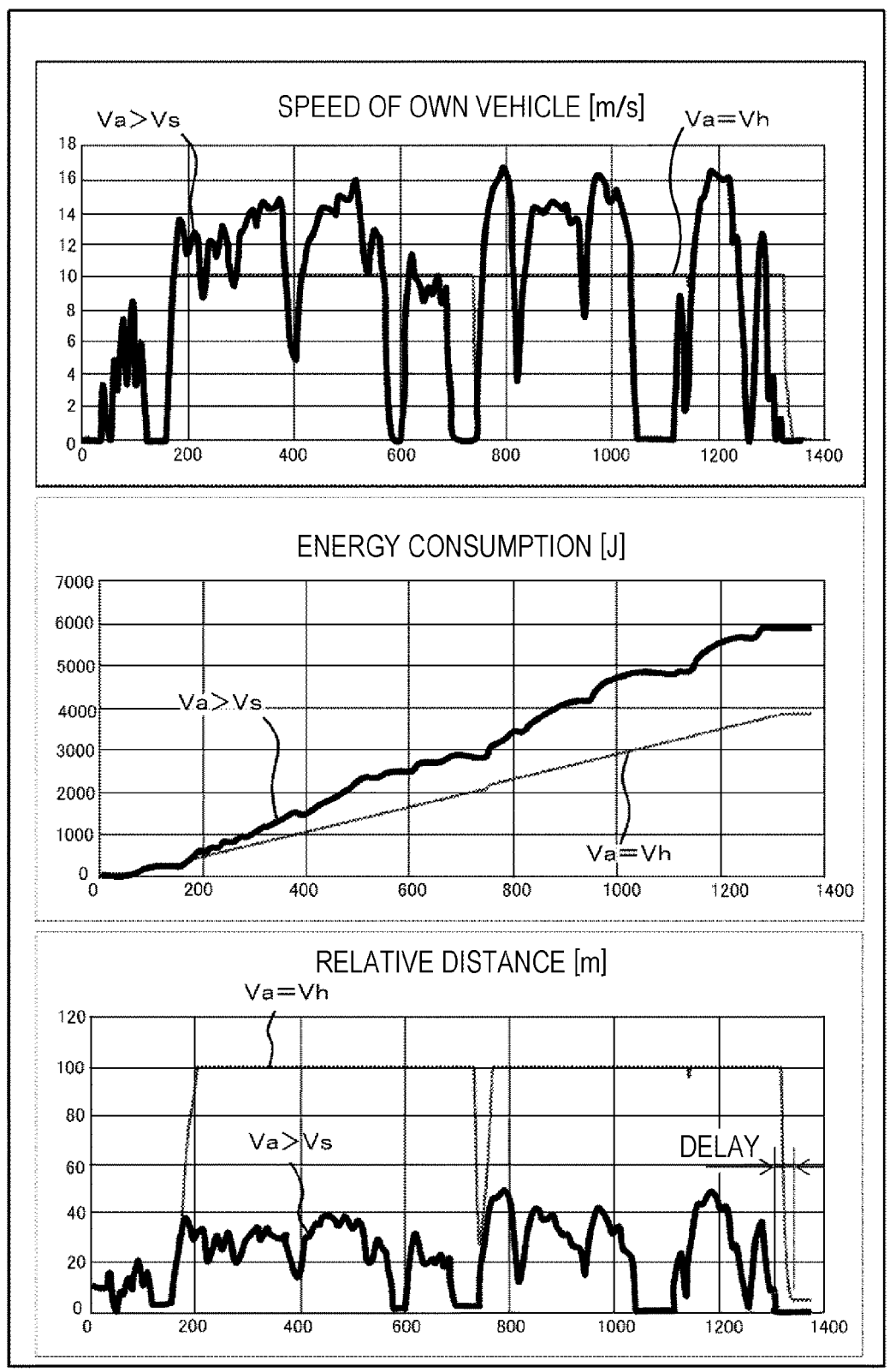
FIG. 3 is a graph illustrating a simulation result of the fuel consumption and a relative distance to a preceding vehicle based on an acceleration/deceleration pattern of a conventional example.

FIG. 3 is a graph illustrating a simulation result of the fuel consumption and a relative distance to the preceding vehicle based on an acceleration/deceleration pattern of a conventional example. The upper stage is a graph for explaining the acceleration/deceleration pattern of the conventional example, the middle stage is a graph showing the fuel consumption of the own vehicle traveling using the acceleration/deceleration pattern, and the lower stage is a graph showing the relative distance between the own vehicle traveling using the acceleration/deceleration pattern and the preceding vehicle. In the graph, the thick line is the simulation result when the set speed Va (cruising speed) is higher than the preceding vehicle speed Vs (Va>Vs), and the thin line is for when the set speed Va (cruising speed) is the average speed Vh. Here, the average speed Vh is usually obtained by dividing the travel distance by the travel time, but in the present embodiment, it can be calculated by dividing the travel distance by the value obtained by subtracting the stop time from the travel time (average speed Vh=Travel distance/(travel time-stop time)).

As shown in the upper stage of FIG. 3, when the set speed Va is set higher than the preceding vehicle speed Vs (the upper part of FIG. 3: thick line), the own vehicle follows the preceding vehicle, so that fine acceleration/deceleration can be performed even during the cruise driving. On the other hand, when the set speed Va is the average speed Vh (upper stage of FIG. 3: thin line), the own vehicle is often separated from the preceding vehicle, and there are many scenes where the vehicle travels at the predetermined set speed Va. As a result, as shown in the middle stage of FIG. 3, when the set speed Va is the average speed Vh, the fuel efficiency significantly improves as compared with a case where the set speed Va is the preceding vehicle speed Vs, but as shown in the lower stage of FIG. 3, it is clear that the relative distance to the preceding vehicle is greatly separated and the travel time as a whole becomes long. The simulation described above does not take into consideration interruptions at traffic lights and intersections provided in the traveling scheduled zone, and the like, and further delays may occur in the actual driving. Therefore, in the vehicle control device 1 according to the present invention, as described below, the acceleration/deceleration pattern 100 is generated based on the acceleration/deceleration of the vehicle that has occurred in the past to achieve both reduction in fuel consumption and reduction in travel time.

Vehicle Control Device

Figure 4:
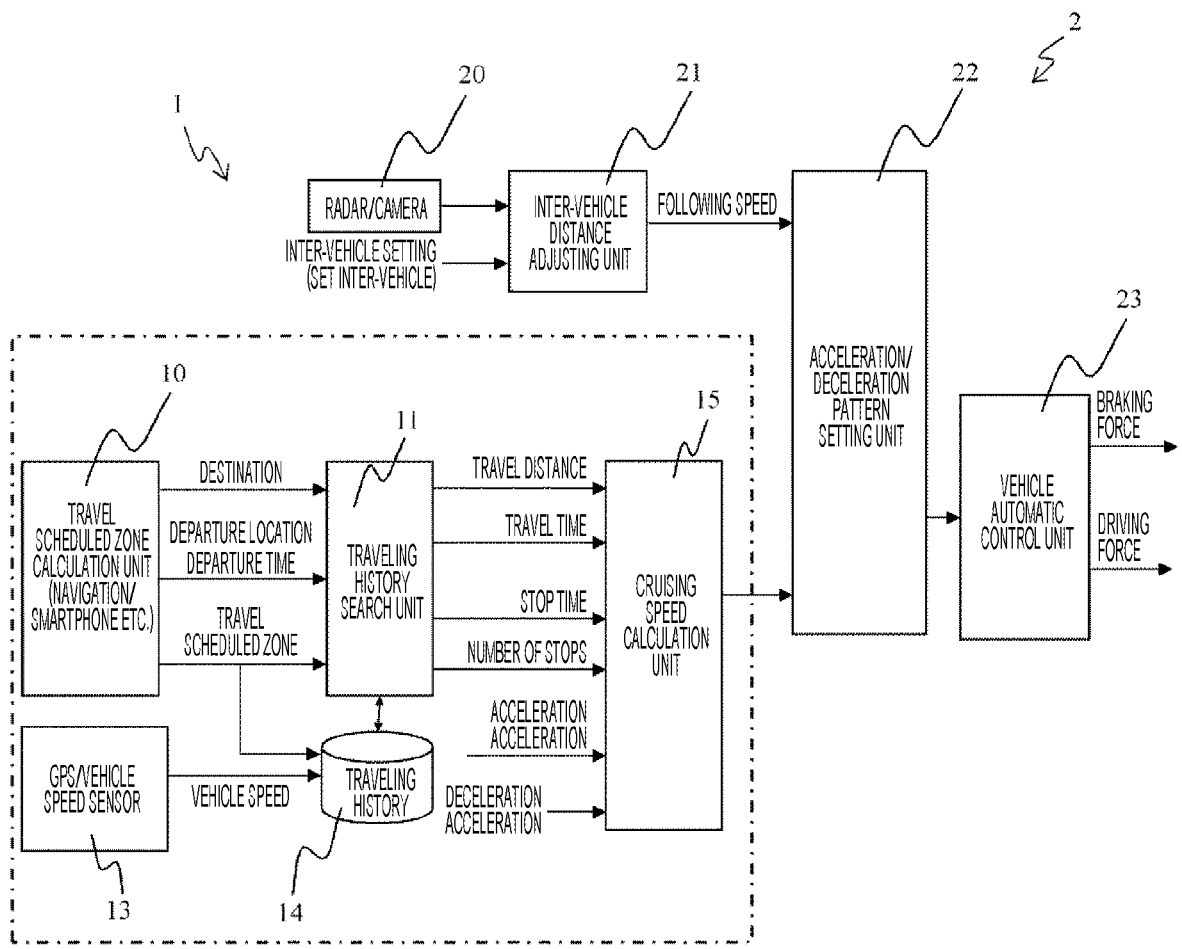
FIG. 4 is a functional block diagram when the vehicle control device is applied to an ACC device.

FIG. 4 is a functional block diagram when the vehicle control device 1 is applied to the ACC device 2 described above. The same reference numerals are denoted on the same configurations and functions as those described above and description thereof will be omitted.

As shown in FIG. 4, the traveling scheduled zone calculation unit 10 is a car navigation (hereinafter also referred to as a navigation) mounted on a vehicle or a smartphone (hereinafter also referred to as a smartphone) owned by a driver, and sets the traveling scheduled zone from the current location (departure location) and the destination acquired by such devices. The navigation/smartphone is an example of the above-described traveling scheduled zone calculation unit 10 (see FIG. 1), and is not limited to the navigation/smartphone as long as the current location information and the destination information can be acquired. If there are no information such as the current location and the destination acquired by the navigation/smartphone or the like, the traveling scheduled zone calculation unit 10 may make an estimation based on the past traveling history from the departure time of the vehicle or the like. For example, when departing at 7:00 a.m. from Monday to Friday (also called weekdays), the traveling scheduled zone calculation unit 10 extracts a zone that is traveled the most (e.g., commuting route) when departing at the same time on weekdays from the database 14 or the like in which the past traveling history is stored, and estimates the same as the traveling scheduled zone. The GPS/vehicle speed sensor 13 is mounted on the vehicle and acquires the current position and the vehicle speed of the vehicle. The vehicle speed acquired by the GPS/vehicle speed sensor 13 and the traveling scheduled zone set by the traveling scheduled zone calculation unit 10 are stored in the database 14 in association with each other, so that a plurality of acceleration/deceleration patterns 100 calculated from the traveling history can be generated and set. The traveling history search unit 11 searches the database 14 after the traveling scheduled zone is set by the traveling scheduled zone calculation unit 10 and extracts the past traveling distance, travel time, stop time, and number of stops in the traveling scheduled zone. The cruising speed calculation unit 15 calculates the cruising speed Veco (see FIG. 7) of the vehicle based on the acceleration acceleration (acceleration) and the deceleration acceleration (deceleration) for realizing the preset low fuel consumption driving. Details of the method of calculating the cruising speed Veco of the vehicle by the cruising speed calculation unit 15 will be described later. With this configuration, the acceleration/deceleration pattern setting unit 22 can calculate the acceleration/deceleration pattern 100 based on a large change in acceleration/deceleration in the vicinity of the traffic light and the intersections that frequently occurs in urban traveling, so that the acceleration/deceleration pattern 100 that can reach the destination in a time equivalent to the past travel time can be generated while realizing reduction in fuel consumption.

Traveling History Recording Process

Next, the traveling history recording process performed by the vehicle control device 1 will be described.

Figure 5:
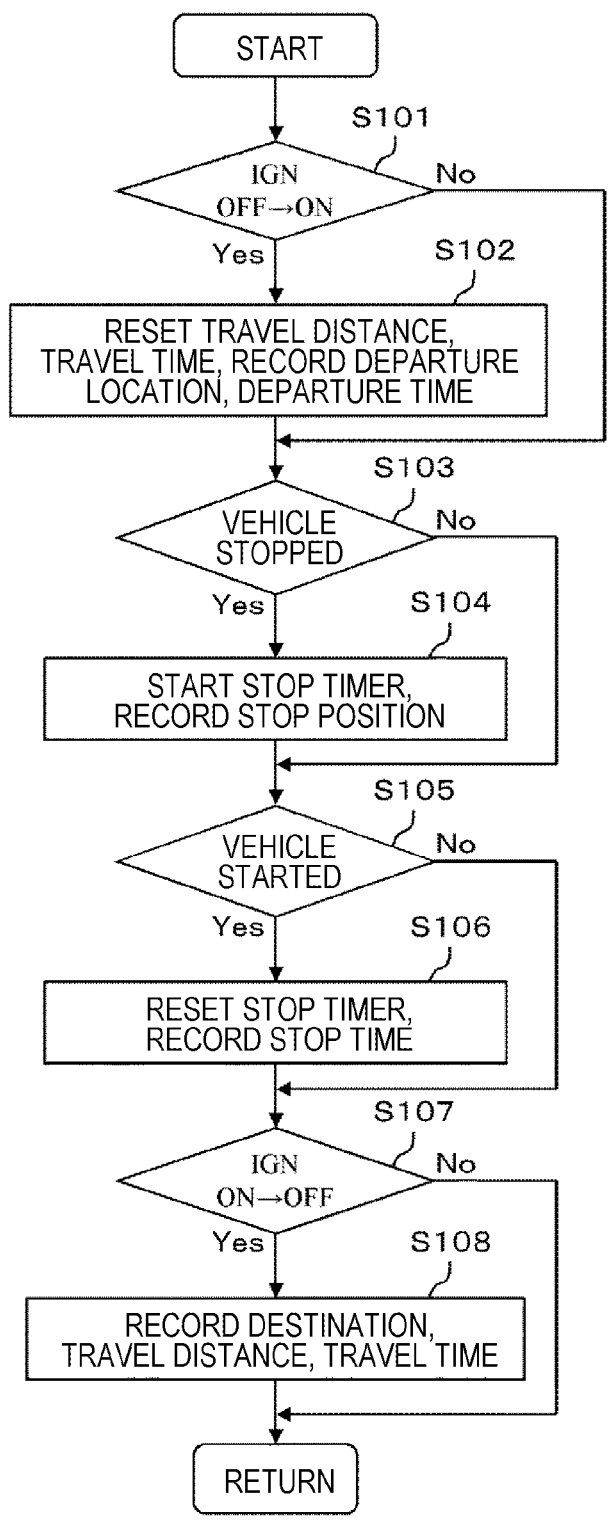
FIG. 5 is a flowchart of a traveling history recording process.

FIG. 5 is a flowchart of the traveling history recording process.

In step S101, whether or not the ignition switch (ING) has been pressed (whether switched from OFF to ON to start the vehicle) is determined, and the process proceeds to step 102 when determined that the ignition switch has been pressed (step S101: Yes), and the process skips step S102 and proceeds to step S103 when determined that the ignition switch has not been pressed (step S101: No). In step S102, the travel distance and travel time recorded in the past are reset, and the current location (departure location) and departure time acquired by the traveling scheduled zone calculation unit 10 are recorded. In this way, the traveling scheduled zone can be predicted from the coordinates of the departure location and the departure time by storing the departure location and the departure time in association with the destination, the travel distance, and the travel time, which will be described later. In step S103, whether the vehicle is stopped is determined, and the process proceeds to step S104 when determined that the vehicle is stopped (step S103: Yes), and the process skips step S104 and proceeds to step S105 when determined that the vehicle is not stopped (step (S103: No). Note that the vehicle stop determination performed in step S103 does not necessarily need to be a state in which the vehicle is completely stationary, and determination may be made that the vehicle is stopped when the speed is lower than the set lower limit speed (e.g., creep speed) set in advance. In step S104, a timer for measuring the stop time of the vehicle is started to measure the stop time of the vehicle, and the stop position of the vehicle acquired from the GPS/vehicle speed sensor 13 or the like is stored. The reason the stop position of the vehicle is stored is because it is used as a key when extracting the number of stops and the stop time at the time of the route search. Thus, the stop information when traveling on the same route as in the past can be searched. In step S105, whether or not the vehicle has started is determined, and the process proceeds to step S106 when determined that the vehicle has started (step S105: Yes), and the process proceeds to step S107 when determined that the vehicle has not started (step S105: No). In step S106, the stop timer started in step S104 is reset and the stop time is stored. In step S107, whether or not the ignition switch (IGN) has been pressed again (the ignition switch has been switched from ON to OFF to stop the vehicle) is determined, and when determined that the ignition switch has been pressed again (step S107: Yes), the destination, the travel distance, and the travel time are stored in step S108 and the process is terminated, and when determined that the ignition switch has not been pressed again (step S107: No), the process is terminated as it is. Thus, by calculating the stop information (stop position, stop time, etc.) in the vehicle at any time, the manufacturing cost and the communication cost can be reduced as compared with when recording and communicating the entire traveling history (e.g., speed). In the embodiment described above, a case where the stop information is stored in the database 14 mounted on the vehicle has been described as an example, but the stop information described above may be stored in an external database outside the vehicle or a cloud provided to be able to communicate the stop information.

Calculation Method of Acceleration/Deceleration Pattern

Next, an example of a calculation method of the acceleration/deceleration pattern 100 by the acceleration/deceleration pattern setting unit 22 will be described.

Figure 6:
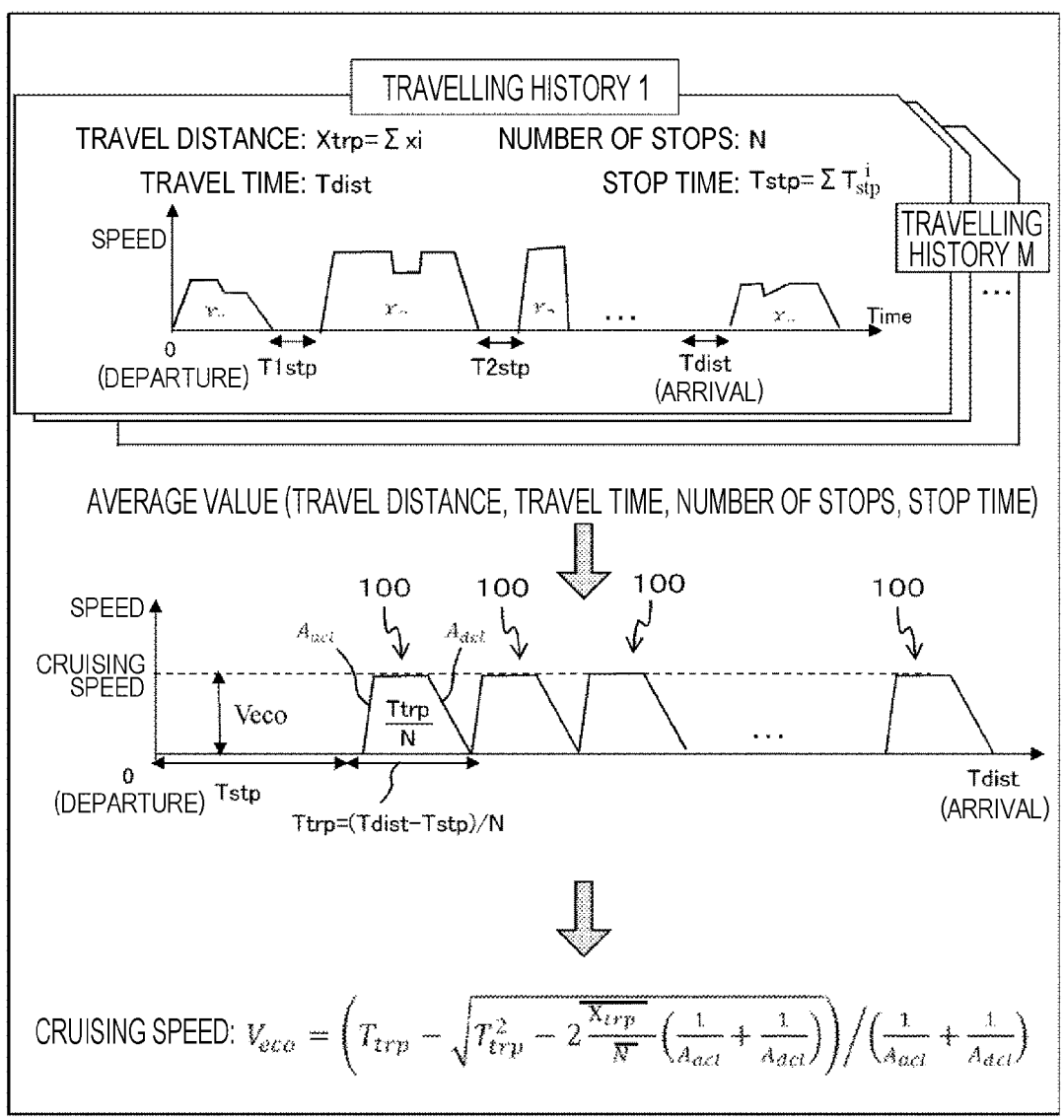
FIG. 6 is a diagram describing an example of a calculation method of an acceleration/deceleration pattern.

FIG. 6 is a diagram describing an example of a calculation method of the acceleration/deceleration pattern 100.

As shown in FIG. 6, in the embodiment, a plurality of traveling histories including at least the travel distance from the departure location to the destination, the travel time, the number of stops of the vehicle, and the stop time are recorded in the database 14. Here, the travel time is the driving time of the vehicle from the departure location to the destination. Of these plurality of traveling histories, for example, the statistical representative values Xtrp, Tdist, N, Tstp of each of the travel distance, the travel time, the number of stops of the vehicle, and the stop time having the traveling history that matches the scheduled traveling scheduled zone in which the vehicle will travel, the traveling history in which the departure location and the destination are the same, or the traveling history in which the departure time and the departure location are the same as a population are calculated. For example, as shown in FIG. 6, the statistical representative value Xtrp of the travel distance is an average value of the values obtained by adding all of a plurality of acceleration/deceleration patterns X1, X2, . . . , XN including acceleration, cruising, and deceleration of a predetermined traveling scheduled zone; and the statistical representative value Tstp of the stop time is an average value of the values obtained by adding the stop (include creep state) time T1stp, T2stp, . . . , TNstp of the vehicle between the respective acceleration/deceleration patterns. In the embodiment, the statistical representative value uses the average value of the population, but the median or the mode may be used depending on the population. Here, the median is a value located at the center of the data group (population), and the mode is a value that appears most frequently in the data group (population). The acceleration/deceleration pattern 100 is calculated on the assumption that acceleration/deceleration is performed by the statistical representative value N of the number of stops on the time obtained by excluding the statistical representative value Tstp of the stop time thus obtained from the statistical representative value Tdist of the travel time. Here, Ttrp is the time required for one acceleration, cruising, and deceleration, and is calculated by Ttrp=(Tdist−Tstp)/N.

Figure 7:
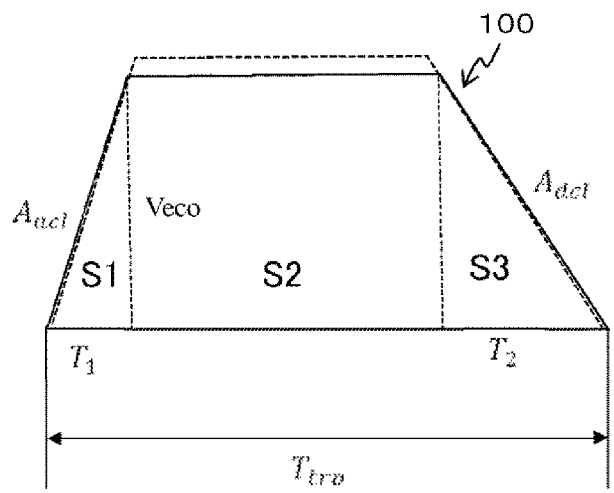
FIG. 7 is an example of an acceleration/deceleration pattern calculated by an acceleration/deceleration pattern setting unit.

FIG. 7 is an example of an acceleration/deceleration pattern 100 calculated by the acceleration/deceleration pattern setting unit 22.

In FIG. 7, the acceleration (acceleration acceleration) Aacl and the deceleration (deceleration acceleration) Adcl included in the acceleration/deceleration pattern 100 are set to values that result in the most fuel-efficient driving during acceleration and deceleration of the vehicle, and are design parameters determined in advance for every property of the vehicle. Specifically, if the acceleration of the vehicle is too high, the transmission and tires will slip and fuel consumption will deteriorate, and hence the acceleration Aacl is preferably set to the acceleration at which the transmission and tires do not slip and the acceleration that maximizes the fuel efficiency of the vehicle. Furthermore, although it is considered that the driver's tolerance will increase if the deceleration Adcl of the vehicle is set to a statistical representative value of stop deceleration, if the deceleration of the vehicle is too large, efficient deceleration of satisfactory fuel efficiency by the engine brake cannot be performed, and hence it is preferable to calculate the statistical representative value by using the deceleration data when the engine brake is used for a long time as a population to realize a more fuel-efficient driving. As a result, as shown in FIG. 7, the deceleration pattern 100 including the acceleration Aacl and the deceleration Adcl can be represented by a trapezoidal shape. When the acceleration/deceleration pattern 100 has a trapezoidal shape, the traveling distance (area) is determined by Xtrp/N, and the time of the upper side and the bottom side are also determined, so the cruising speed Veco (set speed) can be calculated as the solution of the quadratic equation. Since the cruising speed Veco can be expressed by a quadratic equation, two solutions can be derived, but the smaller the speed, the lower the fuel consumption, and thus the smaller solution is set as the cruising speed Veco. In the acceleration/deceleration pattern setting unit 22, the calculation is simple as the acceleration/deceleration pattern 100 can be represented by a trapezoidal shape, and the fuel consumption reduction effect of the present invention becomes higher when the cruising time Ttrp is large.

Next, the relationship between the cruising speed calculated using the acceleration/deceleration pattern 100 described above, the average speed, and the speed limit will be described.

Figure 8:
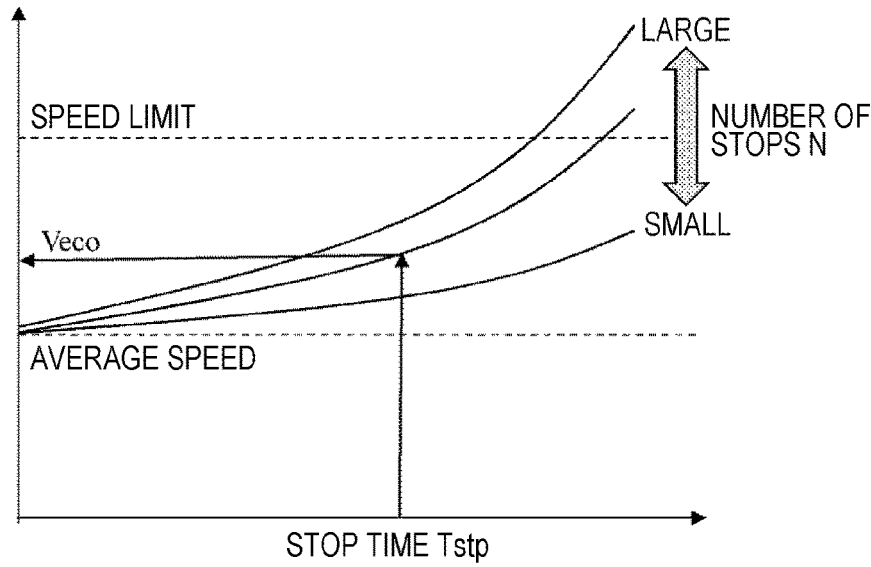
FIG. 8 illustrates the relationship between the cruising speed calculated using the acceleration/deceleration pattern, the average speed, and the speed limit.

FIG. 8 illustrates the relationship between the cruising speed calculated using the acceleration/deceleration pattern 100, the average speed, and the speed limit.

The cruising speed Veco is uniquely determined from the statistical representative value Tstp of the stop time and the statistical representative value N of the number of stops from the calculation formula of the cruising speed Veco shown in FIGS. 6 and 7 (see FIG. 8). As shown in FIG. 8, even if the statistical representative value Tstp of the same stop time is small, if the statistical representative value N of the number of stops is small, the cruising speed Veco becomes small and the fuel consumption reduction effect becomes large, where when the statistical representative value N of the number of stops is 0 (zero), the vehicle is not stopped, and thus the average speed (travel distance/travel time) and the cruising speed Veco calculated using the acceleration/deceleration pattern 100 described above are the same value. Since the cruising speed Veco that results in low fuel consumption can be calculated using the acceleration/deceleration pattern 100 described above, it is also possible to search for a fuel-efficient driving route using the same. Specifically, when a plurality of statistical representative values Tstp of the past stop times and statistical representative values N of the number of stops are obtained, the route with the lowest cruising speed may be calculated.

Figure 9:
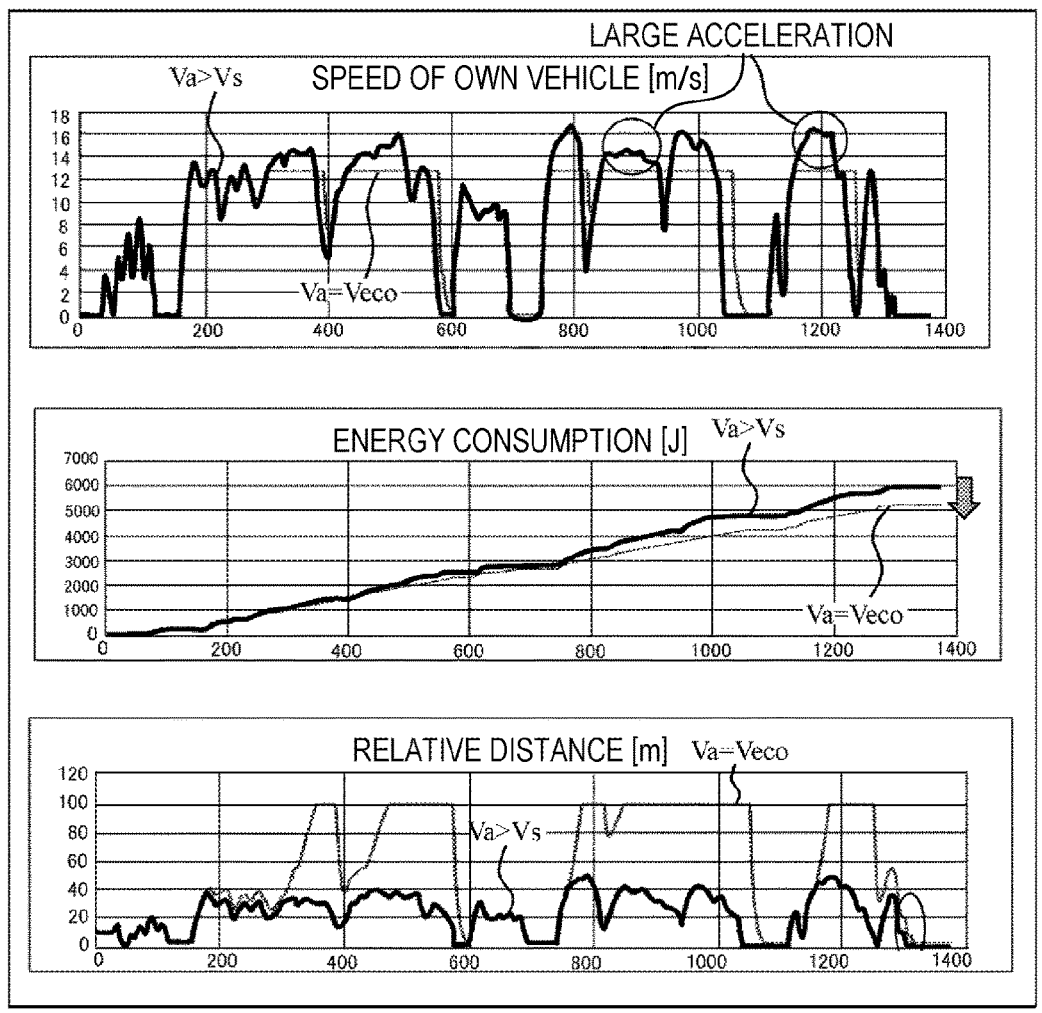
FIG. 9 is a comparison result of a vehicle control simulation by the ACC control using the acceleration/deceleration pattern of the embodiment and the conventional ACC control.

FIG. 9 is a comparison result of a vehicle control simulation by the ACC control using the acceleration/deceleration pattern of the embodiment and the conventional ACC control. The upper stage in FIG. 9 is a graph for explaining the acceleration/deceleration pattern 100, the middle stage is a graph showing the fuel consumption of the own vehicle traveling using the acceleration/deceleration pattern 100, and the lower stage is a graph showing the relative distance between the own vehicle traveling using the acceleration/deceleration pattern 100 and the preceding vehicle. In the graph, a thin line is a simulation result of the ACC control using the acceleration/deceleration pattern 100 of the present application, and a thick line is a simulation result of the conventional ACC control.

FIG. 9 shows a case where the set speed Va of the conventional ACC control is larger than the preceding vehicle speed Vs (Va>Vs), where in the present application, the cruising speed Veco calculated from the acceleration/deceleration pattern 100 described in FIGS. 6 and 7 is used as the set speed Va. As shown in the upper stage of FIG. 9, it can be seen that in the conventional ACC control (thick line in the figure), it follows the acceleration/deceleration of the preceding vehicle thus causing unnecessary acceleration/deceleration and resulting in poor fuel efficiency. On the other hand, in the ACC control (thin line) using the acceleration/deceleration pattern 100 of the present application, the own vehicle performs cruise driving at a constant speed when the speed of the preceding vehicle is higher than the cruising speed Veco. Therefore, as shown in the middle stage of FIG. 9, unnecessary acceleration/deceleration is suppressed and fuel efficiency is improved. In particular, since the cruising speed Veco is set so that the relative inter-vehicle distance with the preceding vehicle does not increase based on the statistical representative value Tstp of the stop time and the statistical representative value N of the number of stops, the travel distance is prevented from becoming long while realizing reduction in fuel consumption. As shown in the lower stage of FIG. 9, it can be seen that the inter-vehicle distance between the own vehicle and the preceding vehicle increases temporarily when the speed of the preceding vehicle becomes higher than the cruising speed of the own vehicle, but the vehicles eventually arrive at about the same time.

As described above, according to the vehicle control device 1 of the present invention, driving in which the travel time is the same as in the past and the fuel consumption is reduced than the past driving can be realized by calculating the acceleration/deceleration pattern 100 based on the statistical representative value of the past stop history (stop time, number of stops).

In the embodiment described above, a case where the number of times the speed fell below the set lower limit speed or the time the speed fell below the set lower limit speed is stored as the traveling history, and the acceleration/deceleration pattern 100 is calculated based on the number of times and the time the speed fell below the set lower limit speed has been described, but the calculation method of the acceleration/deceleration pattern 100 is not limited thereto. For example, the number of times the set lower limit speed is exceeded or the time the set lower limit speed is exceeded may be stored as a traveling history, and the time the set lower limit speed is exceeded or the vehicle speed when the set lower limit speed is exceeded may be stored as the traveling history. Even in this manner, the acceleration/deceleration pattern setting unit 22 can obtain the total time in which the vehicle is not stopped (include creep state) based on the number of times the set lower limit speed is exceeded or the time the set lower limit speed is exceed stored as the traveling history, and thus the acceleration/deceleration pattern 100 including acceleration and deceleration based thereon can be appropriately set. Furthermore, since the acceleration/deceleration pattern setting unit 22 can obtain the total traveling distance based on the time the set lower limit speed is exceeded or the speed when the set lower limit speed is exceeded stored as the traveling history, the acceleration/deceleration pattern 100 including acceleration and deceleration based thereon can be appropriately set.

As described above, in the embodiment, (1) the vehicle control device 1 that automatically controls the speed of the vehicle has a configuration including an acceleration/deceleration pattern setting unit 22 that sets a plurality of acceleration/deceleration patterns 100 including acceleration and deceleration in a traveling scheduled zone and sets the speed to be the same in a region between the acceleration region Aacl and the deceleration region Adcl in each acceleration/deceleration pattern 100 based on the past traveling history in the traveling scheduled zone.

With this configuration, the acceleration/deceleration pattern setting unit 22 sets the acceleration/deceleration pattern 100 based on the results of the traveling history including the past acceleration and deceleration, and thus can set the acceleration/deceleration pattern 100 that results in lower fuel consumption than the past driving.

Furthermore, since the acceleration/deceleration pattern 100 is set so that the speeds of the regions between the acceleration region Aacl and the deceleration region Adcl are the same, the calculation formula for calculating the acceleration/deceleration pattern 100 can be simplified. Therefore, the movement of the vehicle can be controlled so that the travel time does not become long compared to the past driving while reducing the fuel consumption of the vehicle.

(2) Furthermore, the traveling history is configured to include the number of times the vehicle has fallen below the set lower limit speed or the time when it has fallen below the set lower limit speed when traveling in the traveling scheduled zone.

With this configuration, the traveling history includes the number of times the vehicle has fallen below the set lower limit speed at which the vehicle is determined to be stopped or the time when the vehicle has fallen below the set lower limit speed, and thus the acceleration/deceleration pattern setting unit 22 can generate the acceleration/deceleration pattern 100 in view of the number of stops or the stop time in the traveling scheduled zone. Therefore, the movement of the vehicle can be controlled more appropriately so that the travel time does not become long compared to the past driving while reducing the fuel consumption of the vehicle.

(3) Furthermore, the traveling history is configured to include the number of times the vehicle has exceeded the set lower limit speed or the time when it has exceeded the set lower limit speed when traveling in the traveling scheduled zone.

With this configuration, the traveling history includes the number of times the vehicle has exceeded the set lower limit speed at which the vehicle is determined to have accelerated or the time when the vehicle has exceeded the set lower limit speed, and thus the acceleration/deceleration pattern setting unit 22 can generate the acceleration/deceleration pattern 100 in view of the number of accelerations or acceleration time in the traveling scheduled zone. Therefore, the movement of the vehicle can be controlled more appropriately so that the travel time does not become long compared to the past driving while reducing the fuel consumption of the vehicle.

(4) Furthermore, the traveling history is configured to include the time the vehicle has exceeded the set lower limit speed or the vehicle speed at which the vehicle has exceeded the set lower limit speed when traveling in the traveling scheduled zone.

With this configuration, the traveling history includes the number of times the vehicle has exceeded the set lower limit speed at which the vehicle is determined to have accelerated or the vehicle speed at which the vehicle has exceeded the set lower limit speed, and thus the acceleration/deceleration pattern setting unit 22 can generate the acceleration/deceleration pattern 100 in view of the number of accelerations or speed in the traveling scheduled zone. Therefore, the movement of the vehicle can be controlled more appropriately so that the travel time does not become long compared to the past driving while reducing the fuel consumption of the vehicle.

(5) The acceleration/deceleration pattern 100 is a pattern in which the vehicle accelerates, travels at the set speed (cruising speed), and then decelerates, and the acceleration/deceleration pattern setting unit 22 is configured to set the acceleration/deceleration pattern 100 based on a statistical representative value (average value, median, or mode) of the number of times the vehicle has fallen below the set lower limit speed and the time the vehicle has fallen below the set lower limit speed of the traveling history.

With this configuration, since the acceleration/deceleration pattern setting unit 22 sets the acceleration/deceleration pattern 100 based on the statistical representative value of the number of times the vehicle has fallen below the set lower limit speed and the time the vehicle has fallen below the set lower limit speed, and thus can set an appropriate acceleration/deceleration pattern in which the travel time does not become long compared to the past driving while reducing the fuel consumption of the vehicle.

(6) Furthermore, the acceleration/deceleration pattern setting unit 22 is configured to set the set speed to be lower than the speed limit of the traveling scheduled zone in the traveling history.

With this configuration, since the acceleration/deceleration pattern setting unit 22 sets the set speed (cruising speed) of the acceleration/deceleration pattern 100 so as to be lower than the speed limit of the traveling scheduled zone, it can be appropriately controlled so that the travel time does not become long compared to the past driving while preventing the speed of the vehicle from exceeding the speed limit of the traveling scheduled zone.

(7) Furthermore, the acceleration/deceleration pattern setting unit 22 is configured to set the set speed to be higher than the average speed (average value of travel distance/travel time) of the traveling scheduled zone in the traveling history.

With this configuration, since the acceleration/deceleration pattern setting unit 22 sets the set speed (cruising speed) of the acceleration/deceleration pattern 100 to be higher than the average speed of the traveling scheduled zone, it can be more appropriately controlled so that the travel time can be more appropriately prevented from becoming long compared to the past driving while reducing the fuel consumption of the vehicle.

(8) Furthermore, the acceleration/deceleration pattern setting unit 22 is configured to set the set speed to become higher as the statistical representative value of the number of stops increases, even if the statistical representative value of the stop time is the same.

With this configuration, the acceleration/deceleration pattern setting unit 22 sets the set speed (cruising speed) of the acceleration/deceleration pattern 100 in accordance with increase in the statistical representative value of the number of stops even if the statistical representative value of the stop time is the same, and thus the travel time can be appropriately prevented from becoming long compared to the past driving.

Second Embodiment

Next, a second embodiment of the present invention will be described. The control device according to the second embodiment is different from the embodiment described above in that the acceleration/deceleration pattern 100A until reaching the target acceleration is adjusted to improve fuel efficiency. The same reference numerals are denoted on the same configurations and functions as those in the embodiment described above and description thereof will be omitted.

Figure 10:
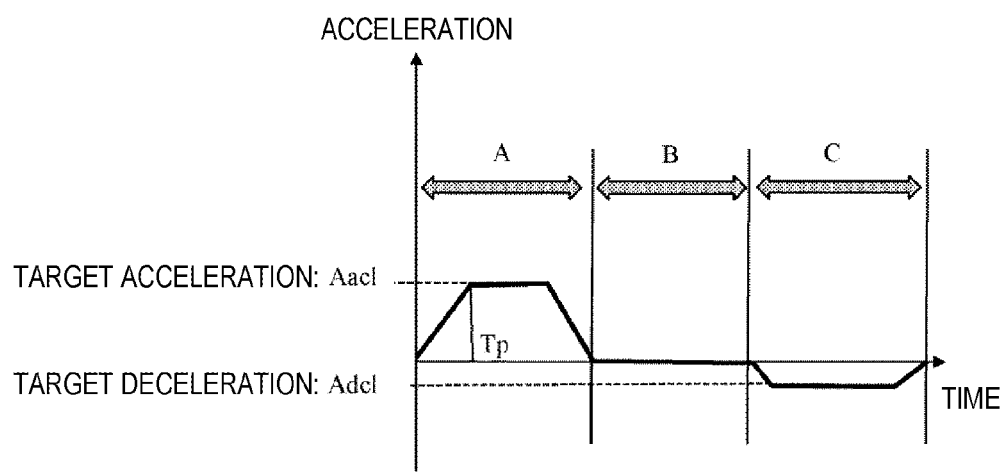
FIG. 10 is a diagram describing an acceleration/deceleration pattern according to a second embodiment.

FIG. 10 is a diagram describing an acceleration/deceleration pattern 100A according to a second embodiment.

Figure 11:
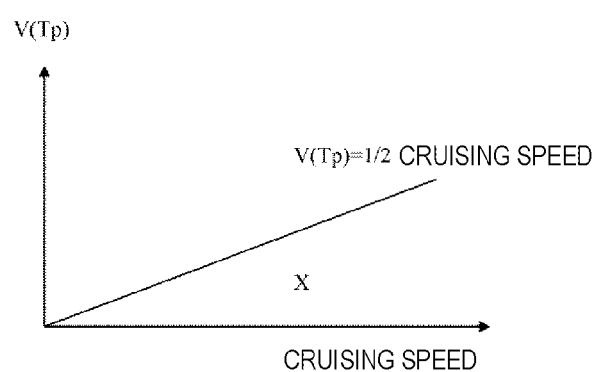
FIG. 11 is a diagram describing a vehicle speed state.

FIG. 11 is a diagram describing a vehicle speed state.

In FIG. 10, A is the acceleration/deceleration pattern 100A of the acceleration acceleration (correspond to Aacl in FIG. 7), B is that of the cruising speed (correspond to the region between Aacl and Adcl in FIG. 7), and C is that of the deceleration acceleration (correspond to Adcl in FIG. 7). As shown in FIG. 10, the target acceleration Aacl is reached at time Tp in the acceleration/deceleration pattern 100A. In general, when the same acceleration is realized, the energy required for acceleration increases as the speed increases. Therefore, in the second embodiment, higher fuel-efficiency driving can be realized by achieving the target acceleration before the vehicle speed becomes half the cruising speed (see FIG. 11).

Figure 12:
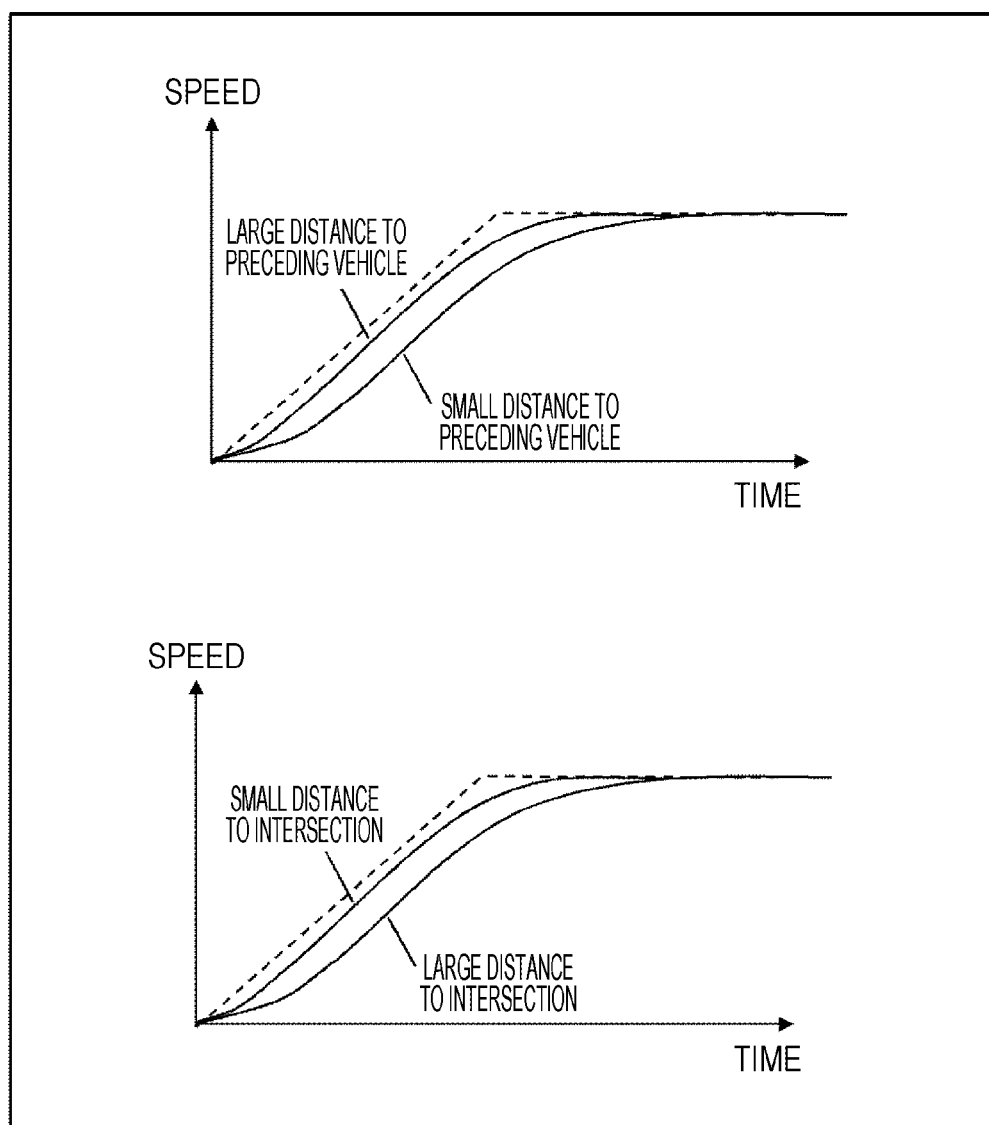
FIG. 12 is a diagram describing an example of an acceleration profile to which the present invention is applied.

FIG. 12 is a diagram illustrating an example of an accelerated bath file to which the present invention is applied. The upper stage of FIG. 12 is an example of a case where the arrival speed V(tp) of the own vehicle to the target acceleration is adjusted according to the distance between the own vehicle and the preceding vehicle, and the lower stage of FIG. 12 is an example of a case where the arrival speed V(tp) of the own vehicle to the target acceleration is adjusted according to the distance between the own vehicle and the intersection (similar for traffic light, railroad crossing etc.).

As shown in the upper stage of FIG. 12, the vehicle control device 1 sets the arrival speed V(tp) to the target acceleration to be lower as the distance between the own vehicle and the preceding vehicle becomes longer.

Thus, not only that the fuel consumption during acceleration can be reduced but the cruise driving time can also be extended, so that low fuel consumption driving can be realized. If the distance from the preceding vehicle is short, increasing the speed V(tp) may cause the own vehicle to catch up with the preceding vehicle, and applying the brakes may lead to deterioration in fuel consumption.

As shown in the lower stage of FIG. 12, in the vehicle control device 1, if the distance between the own vehicle and the intersection (may be a traffic light or a railroad crossing) is long, there is a high possibility that there is a vehicle ahead of the preceding vehicle, and fuel-efficient driving can be realized while avoiding the approach to the preceding vehicle by increasing the arrival speed V(tp) to the target acceleration.

As described above, in the second embodiment, (9) the acceleration/deceleration pattern setting unit 22 is configured to set the acceleration/deceleration pattern 100 so that the vehicle reaches the target acceleration set in advance before reaching the speed of less than or equal to a half of the set speed during the acceleration of the vehicle.

In this type of vehicle, more energy is required to obtain a predetermined acceleration from a state in which the cruising speed of the vehicle is high than the energy for obtaining the same acceleration from a state of low cruising speed. With such a configuration, the acceleration/deceleration pattern setting unit 22 sets the acceleration so that the vehicle reaches the target acceleration before the speed becomes less than or equal to a half of the set speed (cruising speed). Therefore, since the target acceleration can be reached when the vehicle is in a low speed state, the vehicle can be efficiently controlled to a target speed with a small amount of energy.

(10) Furthermore, the acceleration/deceleration pattern setting unit is configured to correct the speed until the vehicle reaches the maximum acceleration according to the distance to the preceding vehicle or the distance to the intersection during the acceleration of the vehicle.

With this configuration, when there is a preceding vehicle or an intersection that causes the vehicle to stop in front, the acceleration pattern until reaching the maximum acceleration is corrected to be reduced in advance according to the distance to the preceding vehicle or the intersection, so that energy for performing unnecessary acceleration can be suppressed.

Moreover, the present invention is not limited to that including all the configurations of the embodiments described above, and a part of the configuration of the embodiments described above may be replaced with the configuration of another embodiment, or the configuration of the embodiment described above may be replaced with the configuration of another embodiment.

In addition, some configurations of the embodiments described above may be added, deleted and replaced with the configuration of another embodiment.

REFERENCE SIGNS LIST 1 control device
10 traveling scheduled zone calculation unit
11 traveling history search unit
12 acceleration/deceleration pattern setting unit
13 GPS/vehicle speed sensor
14 database
15 cruising speed calculation unit
2 ACC device
20 camera/radar
21 inter-vehicle distance adjusting unit
22 acceleration/deceleration pattern setting unit
23 vehicle automatic control unit
100 acceleration/deceleration pattern
Xtrp statistical representative value of travel distance
Tdist statistical representative value of travel time
N statistical representative value of number of stops of vehicle
Tstp statistical representative value of stop time of vehicle
Veco cruising speed
Aacl acceleration (acceleration acceleration)
Adcl deceleration (deceleration acceleration)

The invention claimed is:

1. A vehicle control device that automatically controls a speed of a vehicle, the vehicle control device comprising a processor configured to:
set a plurality of acceleration/deceleration patterns based on at least one statistical representative value and including acceleration and deceleration in a traveling scheduled zone; and
set the speed to be the same in a region between an acceleration region and a deceleration region in each acceleration/deceleration pattern based on traveling history in the traveling scheduled zone,
wherein the at least one statistical representative value includes a statistical representative value of number of times the vehicle has fallen below a set lower limit speed, and a statistical representative value of a stop time at which the vehicle has fallen below the set lower limit speed of the traveling history, and
wherein the acceleration and the deceleration included in the plurality of acceleration/deceleration patterns are based on predetermined design parameters associated with a vehicle.

2. The vehicle control device according to claim 1, wherein the traveling history includes the number of times the vehicle has fallen below the set lower limit speed or a time when the vehicle has fallen below the set lower limit speed when traveling in the traveling scheduled zone.

3. The vehicle control device according to claim 1, wherein the traveling history includes the number of times the vehicle has exceeded the set lower limit speed or a time when the vehicle has exceeded the set lower limit speed when traveling in the traveling scheduled zone.

4. The vehicle control device according to claim 1, wherein the traveling history includes the number of times the vehicle has exceeded the set lower limit speed or a vehicle speed at which the vehicle has exceeded the set lower limit speed when traveling in the traveling scheduled zone.

5. The vehicle control device according to claim 1, wherein the acceleration/deceleration pattern is a pattern in which the vehicle accelerates, travels at a set speed, and then decelerates.

6. The vehicle control device according to claim 5, wherein the processor sets the set speed to be lower than a speed limit of the traveling scheduled zone in the traveling history.

7. The vehicle control device according to claim 5, wherein the processor sets the set speed to be higher than an average speed of the traveling scheduled zone in the traveling history.

8. The vehicle control device according to claim 5, wherein the processor sets the set speed to become higher as the statistical representative value of the number of stops increases, even if the statistical representative value of the stop time is the same.

9. The vehicle control device according to claim 5, wherein the processor sets the acceleration/deceleration pattern so that the vehicle reaches a target acceleration set in advance before reaching a speed of less than or equal to a half of the set speed during the acceleration of the vehicle.

10. The vehicle control device according to claim 5, wherein the processor is further configured to correct the speed until the vehicle reaches a maximum acceleration according to a distance to a preceding vehicle or a distance to an intersection during the acceleration of the vehicle.

11. The vehicle control device according to claim 1, wherein the at least one statistical representative value includes a statistical representative value of a travel distance obtained by averaging all of the plurality of acceleration/deceleration patterns of the traveling scheduled zone.

12. The vehicle control device according to claim 1, wherein the acceleration/deceleration pattern is calculated based on that the acceleration/deceleration is performed a statistical representative value N of a number of stops on a time obtained by excluding the statistical representative value of the stop time obtained from a statistical representative value of a travel time.

13. The vehicle control device according to claim 1, wherein the at least one statistical representative value includes a statistical representative value of stop deceleration calculated using deceleration data during engine braking.

14. The vehicle control device according to claim 1, wherein the plurality of acceleration/deceleration patterns are based on traveling history of a plurality of vehicles.

15. The vehicle control device according to claim 1, wherein the processor is further configured to cause an output of a notification notifying a driver of the traveling history of the vehicle.

* * * * *